United States Patent
Kohno et al.

(10) Patent No.: US 6,254,995 B1
(45) Date of Patent: *Jul. 3, 2001

(54) COATING FROM WHICH DEPOSITS ARE EASILY REMOVED AND USE THEREOF

(75) Inventors: Kenji Kohno, Ibaraki; Hiroyuki Mitsuhashi, Kyoto; Kazushi Miyata, Mishima-gun, all of (JP)

(73) Assignee: Hitachi Maxell, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,045
(22) PCT Filed: Apr. 11, 1997
(86) PCT No.: PCT/JP97/01258
§ 371 Date: Dec. 11, 1997
§ 102(e) Date: Dec. 11, 1997
(87) PCT Pub. No.: WO97/38055
PCT Pub. Date: Oct. 16, 1997

(30) Foreign Application Priority Data

Apr. 11, 1996 (JP) ................................... 8-115745

(51) Int. Cl.$^7$ ..................................... B32B 27/00
(52) U.S. Cl. ..................... 428/473.5; 427/335; 427/336; 427/377; 427/385.5
(58) Field of Search .................................. 427/154, 153, 427/156, 335, 336, 377, 378, 385.5; 428/473.5

(56) References Cited

U.S. PATENT DOCUMENTS

| | | |
|---|---|---|
| 4,920,158 | 4/1990 | Murray et al. |
| 5,494,202 * | 2/1996 | Blane et al. .......................... 427/154 |
| 5,672,633 * | 9/1997 | Brehm et al. ...................... 521/149 X |
| 5,728,742 * | 3/1998 | Staples et al. .................... 521/149 X |

FOREIGN PATENT DOCUMENTS

| | | |
|---|---|---|
| 601502 * | 6/1994 | (EP) . |
| 0601502A2 | 6/1994 | (EP) . |
| 0648823A1 | 4/1995 | (EP) . |
| 648823 * | 4/1995 | (EP) . |
| 0659848A2 | 6/1995 | (EP) . |
| 2253075 | 6/1975 | (FR) . |
| 1496345 | 12/1977 | (GB) . |
| 6-222604 | 8/1994 | (JP) . |
| 10156 * | 12/1988 | (WO) . |
| WO8810156 | 12/1988 | (WO) . |
| WO9401593 | 1/1994 | (WO) . |

* cited by examiner

*Primary Examiner*—Brian K. Talbot
(74) *Attorney, Agent, or Firm*—Birch, Stewart & Kolasch & Birch, LLP

(57) ABSTRACT

A material having a substrate and a coating formed on the surface of the substrate, in which the coating contains a resin swellable with water such as an acrylic copolymer, and a water-soluble compound such as polyethylene glycol. When such a coating is formed on the surface of a material such as an office automation sheet, inks and other deposits can be easily removed with water from the surface, and the office automation sheet can be repeatedly used. Thus, such a coating is useful for reserving resources and protecting environments. Furthermore, dirts can be easily removed from furniture, electric appliances, and the like.

19 Claims, 1 Drawing Sheet

COATING FROM WHICH DEPOSITS ARE EASILY REMOVED AND USE THEREOF

This application claims the benefit under 35 U.S.C. §371 of prior PCT International Application No. PCT/JP 97/01258 which has an International filing date of Apr. 11, 1997 which designated the United States of America, the entire contents of which are hereby incorporated by reference.

BACKGROUND OF THE INVENTION

1. Field of the Invention

The present invention relates to a coating from which deposits are easily removed with water and the like, and a method for using the same. In particular, the present invention relates to a coating which is formed on the surface of a material and makes it possible to repeatedly remove deposits from the surface (hereinafter referred to as a "deposit-easy-removable coating").

The coating of the present invention does not prevent the adhesion of deposits by nature. Rather, it allows the adhesion of the deposits and easy removal of the deposits by the treatment with water and the like. Thus, such a coating is herein referred to as a "deposit-easy-removable coating".

2. Description of Related Art

It is difficult to remove deposits from material surfaces. Even oils should be cleaned with a quantity of water containing a surfactant with considerable labor, or with organic solvents which are harmful to the human body or environment.

Since waxy or solid deposits are hardly removed with the surfactants, they should be removed with organic solvents, or mechanically scraped off, which require heavy work. But, such deposits may not be completely removed, or the materials to which the deposits adhere may be damaged. In many cases, the waxy or solid deposits are not removed.

It is possible to remove the deposits by forming a releasable or soluble coating on material surfaces and removing the deposits together with the coating. However, whenever the coating is removed, a fresh coating should be formed, or the removed coating generates an additional waste. Therefore, this technique does not provide an essential solution.

As coatings from which the deposits can be repeatedly removed, coatings of fluororesins (for example, TEFLON™) are known. However, they are not widely used, since they are expensive, kinds of surfaces on which such coatings can be formed are limited, they have low transparency, or materials are hardly used with carrying deposits such as characters because of too easy removal of the deposit.

In the case of office automation sheets such as OHP (overhead projector) films or papers for copying, and the like, they are used and wasted in a large scale and cause the environmental problem, since inks cannot be removed from their surfaces.

As a measure for solving the above problems, EP-A-0 601 502 discloses fixing, to a surface of a material, of a deposit-easy-removable coating which consists of a film comprising a hydrophilic resin that is in a solid state at room temperature in an air, and which swells but is not washed off with water.

Deposits can be easily removed from the deposit-easy-removable coating disclosed in the above EP application by cleaning with water without causing adverse effects on the human body or environment. However, the removal of deposits, which have a high adhesion force or have high viscosity and thus easily redeposit on the surfaces, requires a long time, and the removing procedures should be repeated to remove such deposits sufficiently. Thus, deposit-removing properties of the coatings should be further improved from the practical point of view.

SUMMARY OF THE INVENTION

An object of the present invention is to provide a deposit-easy-removable coating having improved deposition-removing properties so that deposits can be easily and quickly removed from the surface of the coating.

Another object of the present invention is to provide a method for reusing such a deposit-easy-removable coating.

According to the first aspect, the present invention provides a coating comprising a resin swellable with water and a water-soluble compound, from the surface of which deposits can be removed repeatedly.

According to the second aspect, the present invention provides a material comprising a substrate and a coating of the present invention formed on the surface of the substrate.

According to the third aspect, the present invention provides a method for using a coating comprising a resin swellable with water and a water-soluble compound, the method comprising the steps of:

allowing said coating carrying adhered deposits on its surface in contact with at least one removing component selected from the group consisting of water, aqueous solutions and steam, swelling said coating and, at the same time, removing the deposits with the removing component, and drying said coating to restore the reusable state of said coating.

DETAILED DESCRIPTION OF THE INVENTION

Figure 1:
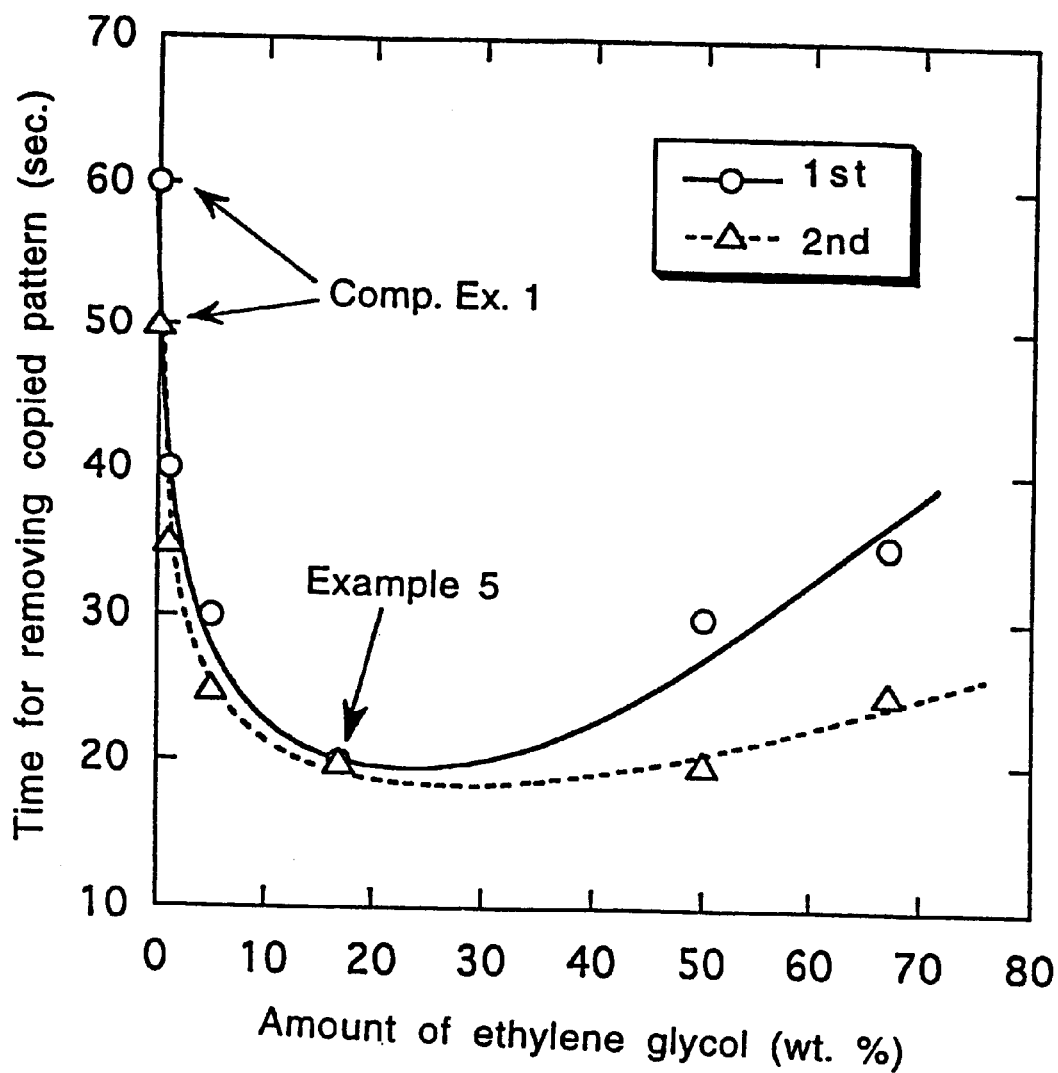
FIG. 1 is a graph showing the relationship between an amount of added ethylene glycol and a time for removing a copied pattern, in Example 5.

The deposit-easy-removable coating of the present invention contains a resin swellable with water, and the swelling of this resin may contribute to the removal of deposits. However, the mechanism for the removal of the deposits has not been completely clarified. The mechanism for the removal of the deposits may be assumed as follows:

The deposits adhered to the coating surface may be removed through the decrease of the adhesion force of the deposits by the hydration of the polymer chains of the swellable resins, or the generation of strain between the resins and deposits due to the expansion or softening of the resins.

The "deposits" used herein are intended to mean materials which can adhere to the surface of the coating, and include water-soluble materials, oily materials, and the like. The effects of the present invention are remarkable, when the deposits are oily ones.

Although the deposits adhere to the surface of the coating of the present invention, they can be repeatedly removed from the coating surface since the coating swells with water.

Examples of the resin to be contained in the coating of the present invention are resins having a polar functional group or a hydrophilic chain. Examples of the polar functional group or hydrophilic chain are a carboxyl group, a hydroxyl group, a sulfonic acid group, an amide group, an amino group, a phosphoric acid group, their slats, a polyethylene glycol chain, etc.

Examples of the resins having such a functional group or a hydrophilic chain are homo- or copolymers of (meth) acrylic acid, 2-(meth)acryloyloxyethylsuccinic acid, vinyl alcohol, hydroxyethyl (meth)acrylate, dihydroxypropyl (meth)acrylate, (meth)acrylamido-2-methylpropanesulfonic acid, (meth)acrylamide, N,N-dimethyl-(meth)acrylamide, N-(meth)acrylylglycinamide, N-isopropyl-(meth) acrylamide, N,N-dimethylaminopropyl(meth)acrylamide, vinylpyrrolidone, N,N-dimethylaminoethyl (meth)acrylate, allylamine, vinylcarbazole, their salts, their quaternary compounds at their amino groups, (meth)acrylates having oligo- or polyethylene glycol chains; copolymers of at least one of the above monomers with other monomers; cellulose compounds (e.g. methyl cellulose, ethyl cellulose, propyl cellulose, hydroxyethyl cellulose, hydroxypropyl cellulose, etc.), polyethylene glycols, or copolymers of polyethylene glycol and other monomers; and the like.

The hydrophilicity of the resins can be evaluated by measuring a receding water contact angle. Resins having a receding water contact angle of 40 degrees or less, preferably 20 degrees of less, more preferably 10 degrees or less, in particular about 0 degree are preferably used.

A receding water contact angle is measured by forming a water droplet on the surface of a resin film, sucking water with a syringe, etc, and measuring an angle at which the water droplet is in contact with the resin surface with a protractor, when the edge of the water droplet starts to move inwardly. When certain aqueous solutions, such as aqueous solutions of electrolytes, are used for removing the deposits from the coating, and they change the hydrophilicity of the coating, the receding contact angle should be measured after dipping the coating in the aqueous solutions and drying it.

The resins used in the present invention preferably have a weight swell of at least 1.5 times for the removal of the deposits. The volume swell herein used is calculated from the weight of the coating after dipping it in water for 24 hours, and the weight of the coating after drying the swelled coating for 24 hours or longer until the weight becomes constant, according to the equation: (weight of swelled coating)/(dry weight of coating after swelling).

For easy measurement, the coating of the present invention is formed on a polytetrafluoroethylene sheet, the formed coating film is peeled off and placed in a container having a net bottom, and then the lower part of the container is immersed in water to swell the coating film.

The coating film, which is subjected to the measurement of the weight swell, is often formed on the surface of a substrate and bonded to the substrate. In such a case, (1) the substrate carrying the coating is dipped in water, or (2) the coating film is peeled off from the substrate by quenching, or scraped off from the substrate, and then the removed coating film is placed in the above container having the net bottom, followed by immersing the lower part of the container in water. In the former case, the thickness of the coating after swelling and drying is measured as follows:

The cross section of the coating film and substrate is observed with an electron microscope, or a part of the coating film is peeled off from the substrate, and the size of the formed step is measured with a tracer type thickness meter or a laser microscope. Alternatively, the whole thickness of the substrate and coating film is measured by the same observation of the cross section as above, or with a micrometer, and then the dry weight of the coating film after swelling is calculated by proportional allotment.

In such a case, a weight swell is calculated according to the following equation:

[(weight of substrate and swelled coating film)−(dry weight of substrate and coating film after swelling)+(dry weight of coating film after swelling)]/(dry weight of coating film after swelling).

As the resins swellable with water, crosslinked resins are advantageously used. The crosslinking of the resins is carried out by reacting crosslinkable functional groups of the resins with functional groups of a crosslinking agent, or reacting the functional groups of the resin with each other. Alternatively, it may be possible to physically crosslink the resins through hydrogen bonds, ionic bonds, hydrophobic interaction, and the like.

Herein, the resins having the crosslinkable functional groups include homo- or copolymers of monomers having crosslinkable functional groups, homo- or copolymers of monomers having reactive functional groups at least one of which are bonded with compounds having crosslinkable functional groups, and the like.

Examples of the crosslinkable functional groups, that is, functional groups which are introduced in the resins or crosslinking agents, are an epoxy group, a carboxyl group, an isocyanate group, a double bond, an acid group, an acid chloride group, an acid anhydride group, a hydroxyl group, an amino group, an oxazoline group, and the like. Crosslinking agents having at least two crosslinkable functional groups are preferable.

Such functional groups can be introduced in the resins by copolymerizing monomers which provide resins swellable with water, and glycidyl (meth)acrylate, (meth)acrylic acid, 2-(meth)acryloyloxyethylsuccinic acid, (meth) acryloyloxyethyl isocyanate, hydroxyethyl (meth)acrylate, and the like. The reaction of the introduced glycidyl groups and (meth)acrylic acid and the like can introduce a double bond in the resins. The resins may be crosslinked by heating, or irradiation of UV light or radiation depending on the kinds of the used functional groups.

When a high adhesion force to a substrate is required, the surface of the substrate to be coated can be pretreated to increase the adhesion force, or covered with a layer made of a different material from that of the substrate, for example, a primer.

For example, the adhesion force is increased by treating the surface of a substrate with p-chlorophenol, trifluoroacetic acid, silane coupling agents, titanium coupling agents, azide compounds, or polymers, or forming a primer layer made of such compounds. When the coating and substrate have different swells, a primer layer having an intermediate swell between them may be formed to absorb strain generated between the coating and substrate.

As described above, the deposits can be repeatedly removed from the surface of the coating comprising the resin which swells with water. However, if the coating consists of the resin only, it takes a long time or removing procedures should be repeated for removing deposits having a high adhesion force or those which have high tackiness and tend to easily redeposit.

Thus, the present invention uses the above resin and water-soluble compound in combination to improve the deposit-removing properties, and make it easy to quickly remove such hardly removable deposits.

The addition of the water-soluble compound to the coating provides a component which is free in the coating. Thus, the free component may interfere the tangling, alignment or orientation of the molecule chains of the resins and maintain the movability of the molecule chains. Furthermore, the molecules of the water-soluble compound gather together in the coating and form microstructures through which low molecular weight molecules pass, or the water-soluble compound is eluted out with water so that voids are formed in the coating. Thereby, water can easily penetrate into the interface between the coating and deposit and the inside of the coating to facilitate the hydration or the swelling and softening of the resins, and thus the time for removing the deposits may be shortened. The above assumptions do not limit the scope of this invention.

The water-soluble compounds are often eluted from the coating when the deposits are removed from the coating with water. Even after the elution of the water-soluble compounds, the effects of the present invention are maintained probably for the above reasons.

The water-soluble compounds should be used in combination with the resins swellable with water when the deposit-easy-removable coating is formed or in the dry state in use. Low volatile compounds are preferably used as the water-soluble compounds. For example, compounds having a boiling point higher than that of water, or a vapor pressure lower than that of water are preferably used.

The water-soluble compound is used in an amount range in which the coating can be formed from the resin swellable with water when the compound is added to the resin during the formation of the coating, or the coating can swell when the compound is added to the formed coating. An optimum amount of the water-soluble resin depends on the resins to be used, crosslinking agents, crosslinking degrees, application forms of the coatings, types of deposits to be removed, methods for removing the deposits, and the like. In general, the amount of the water-soluble resin is at least 0.1 wt. %, preferably between 1 and 90 wt. %, most preferably between 5 and 70 wt. %, based on the weight of the coating.

The water-soluble compound may be a liquid or solid one at room temperature or service temperature of the coating. The water-soluble compounds below the deposits may not be easily eluted by some methods for removing the deposits, and thus the marks of the deposits remain after the removal of the deposits. When such marks are undesired, water-soluble compounds which are in the liquid state at room temperature or service temperature are preferably used.

Typical examples of the water-soluble compounds are low molecular weight compounds such as ethylene glycol, diethylene glycol, triethylene glycol, glycerol, trimethylolpropane, etc.; oligomers and polymers such as polyethylene glycol, polypropylene glycol having a number average molecular weight of 5000 or less; compounds prepared by homo- or copolymerizing hydrophilic monomers; and the like. Examples of the hydrophilic monomers are those having the polar functional groups which are exemplified in connection with the resins swellable with water. The water-soluble compounds may be used independently or in combination.

The deposit-easy-removable coating may optionally contain various additives such as inorganic or organic powders, antistatic agents, plasticizers, lubricants, dyes, pigments, dispersants, resins other than the above described ones, and the like.

It is possible to form other functional layers such as antistatic layers, coloring layers, and the like, in addition to the above described layers for improving the adhesion, below the deposit-easy-removable coating.

The deposit-easy-removable coating can be formed by mixing the water-soluble compound in the swellable resin and then forming the deposit-easy-removal coating, or by forming the layer of the swellable resin and then adding the water-soluble compound to the resin layer. The former method is preferable.

The thickness of the deposit-easy-removable coating is preferably between 0.05 and 50 $\mu$m, more preferably between 0.1 and 30 $\mu$m. When the coating is too thin, the number of repeated uses decreases. When the coating is too thick, the coating may be easily flawed when the deposits are removed.

According to the present invention, the deposits should be repeatedly removed from the deposit-easy-removable coating. If the whole coating is washed out, the material having the coating cannot be repeatedly used. Thus, the coating preferably has a gel content of at least 5 wt. %, more preferably at least 20 wt. %.

The deposit-easy-removable coating according to the present invention is preferably in the solid state in an air at room temperature, so that the coating maintains its shape or coated state. For the practical purposes, the pencil hardness of the coating in the dry state is preferably "6B" or harder, more preferably "2B" or harder in most cases, in the pencil hardness test under the load of 100 g.

From the practical point of view, it is preferable for the deposit-easy-removable coatings not to adhere or bond each other when they are in contact with each other.

Furthermore, the deposit-easy-removable coating is preferably transparent for some applications. For such applications, the transparency of the coating is preferably at least 50%, more preferably at least 70%, in terms of the transmission with light having the wavelength of 550 nm.

The sheet form substrates having the coating of the present invention on their surfaces find a wide variety of applications, and sheets to which inks as the deposits are adhered are typical examples in which the present invention achieves the remarkable effects. In particular, when the inks are adhered to the sheets by copying, typewriting or printing, the coating of the present invention is very effective to decrease the amount of waste paper generated in offices.

In particular, the amount of waste paper generated by copying with copying machines, typewriting with printers or typewriters, or printing has been considerably increasing. According to the present invention, the coating on the sheet-form substrates has compatibility with the inks so that ink images can be formed on the coating and removed from the coating. Therefore, the use of coating of the present invention is very advantageous for the reduction of the amount of waste paper.

It is advantageous that the coating of the present invention can be printed with the toners used in electrophotographic type copiers or laser beam type printers, and the printed toners can be removed from the coating, in view of the amount of paper sheets used in the offices these days.

It is also advantageous that the inks used in other types of typewriting or printing can be removed from the coating. Examples of the ink are ink-jet printing ink, thermal printing ribbon ink, impact printing ink, typewriter ribbon ink and the like. When such inks are used, the coating on the sheet-form substrate preferably has heat resistance and mechanical strength so that it is not deteriorated before and after the provision of the ink by copying, typewriting or printing.

As a sheet-form substrate, a resin film, a paper sheet, a metal foil or their composite or laminate is suitably used depending on the application of the substrate. The sheet-form substrate has flexibility and a thickness sufficient for copying, typewriting or printing. In addition, the substrate preferably maintains flatness before and after the deposition and removal of the ink. That is, the substrate material preferably has heat resistance, water resistance, mechanical properties or shape memory which makes is possible to maintain the flatness.

Preferably, the coating has a shrinkage factor or an expansion factor sufficient for maintaining the flatness before and after the deposition of the ink by copying, typewriting or printing and removal of the ink. When the coatings are formed on both surfaces of a sheet form substrate, it is possible to use the coatings having a wide range of the shrinkage factor or expansion factor, since the influences of the shrinkage or expansion factor offset each other between two surfaces. Preferably, the flatness of the sheet-form substrate to be maintained is such that a height of the most risen part of the sheet is not larger than 20 mm, when the sheet is placed on a flat surface.

It is also preferable that the inks are deposited on the coating of the present invention with writing utensils and removed therefrom, in addition to the inks deposited by copying, typewriting or printing.

The resins used according to the present invention are swelled with water as explained above. From the practical point of view, it is preferable for the resins to be swelled to an extent necessary for the removal of deposits in a specific temperature range for specific applications, for example, for the removal of the above inks. That is, the deposits are adhered to but hardly removed from the coating in use, while the deposits are removed at a high efficiency in the deposit-removing step at a temperature different from the service temperature. For example, for the materials used at room temperature, the temperature range suitable for the removal of deposits of 28° C. or higher is suitable for the use of the materials and also for the designing of the removing step. In order to obtain the above effect, the difference of the swell between the service temperature and deposit-removing temperature is preferably at least 1.5 times.

Examples of resins which achieve the above effect in the specific temperature range are resins having nitrogen-containing groups and/or organic acid groups, and their mixtures. Examples of the nitrogen containing group and organic acid groups are an amide group, an amino group, a carboxylic acid group, and the like. Examples of the resins having such groups are homo- and copolymers of (meth) acrylamide, N,N-dimethyl(meth)acrylamide, N-(meth) acrylylglycinamide, N-isopropyl(meth)acrylamide, N,N-dimethylaminopropyl(meth)acrylamide, vinylpyrrolidone, (meth)acrylic acid, etc., copolymers of these monomers and other monomers, and their mixtures. Specific examples of such resins are combinations of polyacrylic acid and polyacrylamide; polyacrylic acid and polyacrylylglycinamide; polyacrylic acid and polydimethylacrylamide; and the like. For example, with the combination of polyacrylic acid and polyacrylamide, expansion in the molecule level in the presence of water has been proved at a temperature of 29° C. or higher(see Hiroki Katono et al, "HYOMEN" (Surface), 30 (1992) 32).

The coating of the present invention allows easy removal of the deposits with water. The removal of deposits with water has less adverse influences on environments. Heating of water to 30° C. or higher is effective and greatly shortens the removal time of the deposits. The same effect is obtained by heating the coating after the application of water onto the coating.

When the resins are insufficiently swelled only with water and thus the removal of deposits is difficult, or when it is desired to improve the removing efficiency by increasing the swelling rate of the resins, the use of water containing an electrolyte, an alcohol or the like is effective in many cases.

As the electrolyte, salts, bases or acids are suitably used depending of the kinds of resins. Examples of the electrolyte are salts such as sodium hydrogencarbonate, sodium chloride, etc.; bases such as potassium hydroxide, sodium hydroxide, disodium hydrogenphosphate, etc.; acids such as hydrochloric acid, sulfuric acid, nitric acid, phosphoric acid, etc; alcohols such as methanol, ethanol, isopropanol, etc.; and conventional buffers.

Aqueous solutions containing water-soluble compounds may be used. This is effective for maintaining the properties of the coating, in particular, when the water-soluble compound is added to the coating after the formation of the coating.

The addition of surfactants to water is effective for increasing the efficiency of the deposit removal. Any of anionic, cationic and nonionic surfactants may be used, and highly effective surfactants are selected according to the kinds of the resins in the coatings and deposits to be removed.

Water may be used in the state of mist or vapor for the removal of deposits. The use of water in such a state is often effective, since leaching out of the water-soluble compounds is prevented, and the depletion of counter ions, and ion exchange or formation of new ions are suppressed, when the salts or salt-forming groups are used as the functional groups of the resin and water-soluble compounds. In this case, the increase of temperature is also advantageous.

When water, which has been used in the deposit removing step, is discarded without treatment or may be in direct contact with the human body, components which are contained in water or eluted from the coating are preferably ones having less adverse influence on the human body and environments, more preferably biodegradable ones.

The deposits are removed from the coating through the swelling of the resin with water. After that, the coating is dried to restore the reusable state. The drying temperature is selected by taking the properties of the substrates into account. In general, the drying temperature is preferably between 5° C. and 150° C.

The deposit-easy-removable coating according to the present invention can be used in a wide variety of applications for the purpose of the removal of the deposit, and it can be used in the following applications.

To remove the inks, the coating of the present invention is applied to various office automation sheets such as OHP sheets, sheets of paper or paper-like materials, celluloid picture sheets, and the like.

To remove stains such as oil, the coating can be formed on building materials, furniture, ventilation equipments, kerosene heaters, electric appliances, gas equipments, tools, tableware or other daily necessaries. In particular, the coating is effectively used in places which are stained by oils, paints, and the like, for example, a kitchen, a workshop where a machine is used or a paint is applied.

For masking purpose, the coating of the present invention can be used in a painting step or preparation of graphics. In view of good hydrophilicity of the resin which is swelled with water, the coating can be used as an anti-fogging film.

PREFERRED EMBODIMENTS OF THE INVENTON

The present invention will be explained by the following examples.

Following examples used, as deposits, a toner ink which is baked in the copying process by an electrophotographic type copier and most firmly adhered to a coating among the deposits to show that the coatings of the present invention can be successfully used in various applications.

EXAMPLE 1

The following components were charged in a flask equipped with a condenser, and reacted at 70–80° C. for 10 hours under a nitrogen stream while stirring, and a 15 wt. % solution of a hydrophilic resin in isopropanol was obtained:

| Component | Parts by weight |
|---|---|
| Methacrylic acid | 9 |
| Acrylic acid | 1 |
| 2-Hydroxyethyl methacrylate | 13 |
| Acrylamide | 1 |
| N,N-Dimethylaminoethyl methacrylate | 1 |
| Azobisisobutyronitrile | 0.038 |
| Isopropanol | 142 |

Then, to 100 wt. parts of the obtained 15 wt. % solution of the hydrophilic resin in isopropanol, the following compounds were added and stirred at room temperature, and a solution was obtained:

| Compound | Parts by weight |
|---|---|
| Sodium hydroxide | 0.1 |
| Epoxy crosslinking agent [1,3-bis(N,N-diglycidylaminomethyl)-cyclohexane] | 0.075 |
| Polyethylene glycol #200 (number av. molecular weight of about 200) | 0.30 |

The obtained solution was coated in a wet thickness of 10 μm on a polyethylene terephthalate film having a thickness of 100 μm which had been treated with polyurethane, and dried, followed by treatment at 110° C. for 5 hours, and a coated sheet was obtained.

EXAMPLE 2

A coated sheet was prepared in the same manner as in Example 1 except that polyethylene glycol #400 (number average molecular weight of about 400) was used in place of polyethylene glycol #200.

EXAMPLE 3

A coated sheet was prepared in the same manner as in Example 1 except that polyethylene glycol #1000 (number average molecular weight of about 1000) was used in place of polyethylene glycol #200.

EXAMPLE 4

A coated sheet was prepared in the same manner as in Example 1 except that polypropylene glycol #400 (number average molecular weight of about 400) was used in place of polyethylene glycol #200.

EXAMPLE 5

A coated sheet was prepared in the same manner as in Example 1 except that ethylene glycol was used in place of polyethylene glycol #200.

EXAMPLE 6

A coated sheet was prepared in the same manner as in Example 1 except that diethylene glycol was used in place of polyethylene glycol #200.

EXAMPLE 7

A coated sheet was prepared in the same manner as in Example 1 except that glycerol was used in place of polyethylene glycol #200.

EXAMPLE 8

A coated sheet was prepared in the same manner as in Example 1 except that polyethylene glycol #200 was used in an amount of 1.5 wt. parts.

COMPARATIVE EXAMPLE 1

A coated sheet was prepared in the same manner as in Example 1 except that no polyethylene glycol #200 was used.

Using an electrophotographic copying type copier, a pattern was copied on each of the coated sheets prepared in Examples and Comparative Examples to deposit the toner ink on the sheet. Then, a time required for removing the ink with a 1 wt. % aqueous solution of sodium hydrogencarbonate, and a time required for removing the ink which had been deposited on the sheet by recopying the pattern after removing the ink and drying the sheet at 80° C. for about 30 seconds were measured.

The used copier was Zerox 5075, and the copied pattern was five black 1 cm squares.

The printed black squares were gently rubbed with a photographic cellulose sponge soaked with the above sodium hydrogencarbonate solution without applying any load, and a time required for peeling all the squares off was measured. The peeling state was observed with an eye.

A weight swell of each coating was measured as follows:

The resin solution used in each of Examples and Comparative Examples was coated on a TEFLON™ sheet at a dry thickness of 100 μm. The formed film was peeled off from the TEFLON™ sheet and placed in a container having a net bottom, and then the lower part of the container was immersed in water for 24 hours to swell the film. Then, the weight swell was calculated from the weight of the swelled film, and that of the film which had been dried for 24 hours or more until the weight became constant according to the equation: (Weight of swelled film)/(Weight of dried film after swelling).

A gel content of the coating was measured from the weights of the film before and after the above volume swell measurement according to the equation: [(Weight of film before being dipped in water)/(Weight of dried film after swelling)]×100 (unit: %).

| | Weight swell (times) | Gel content (%) | Time for removing copied pattern (seconds) | |
|---|---|---|---|---|
| | | | 1st time | 2nd time |
| Ex. 1 | 12 | 50 | ca. 30 | ca 25 |
| Ex. 2 | 11 | 70 | ca. 30 | ca. 20 |
| Ex. 3 | 11 | 65 | ca. 40 | ca. 30 |
| Ex. 4 | 13 | 70 | ca. 40 | ca. 40 |
| Ex. 5 | 12 | 75 | ca. 20 | ca. 20 |
| Ex. 6 | 12 | 75 | ca. 25 | ca. 20 |
| Ex. 7 | 11 | 70 | ca. 30 | ca. 20 |
| Ex. 8 | 15 | 35 | ca. 30 | ca. 25 |
| Comp. Ex. 1 | 10 | 85 | ca. 60 | ca. 50 |

EXAMPLE 9

A coated sheet was prepared in the same manner as in Example 1 except that the amount of polyethylene glycol in the solution was changed to 0.015 wt. part (1 wt. % in the coating), 0.075 wt. part (5 wt. % in the coating), 1.5 wt. parts (50 wt. % in the coating), or 3.0 wt. parts (67 wt. % in the coating).

The deposition-removing properties of the produced deposition-easy-removable sheets were measured in the same manner as in Example 1. The results are shown in FIG. 1.

As seen from the results in Table 1, the time for removing the toner ink from the deposit-easy-removal coatings which were formed according to the present invention (Examples 1–8) was shorter than that for removing the toner ink from the coating of Comparative Example 1 consisting of the resin swellable with water, and the former coatings maintained the good deposit removing properties after repeated use. In addition, the coatings of the present invention maintained the effects in the second removal of the deposits although the water-soluble compounds were leached out with water in the first removal of the deposits.

As shown in FIG. 1, the deposit removing properties were significantly improved by the addition of ethylene glycol as a water-soluble compound in an amount of at least 1 wt. % to the coatings, and such properties were best around 20 wt. %.

It is clear from the results in Table 1 and FIG. 1 that other deposits can be removed as easily as or more easily than the toner ink, since the baked toner ink, which is most firmly adhered to the substrate material among the deposits, could be easily removed in a short time.

Accordingly, it is understood that the deposit-easy-removable coating can achieve the removal of deposits in a short

What is claimed is:

1. A material comprising a substrate and a reusable coating having a thickness of 0.05 to 50 $\mu$m which comprises a resin swellable with water and a water-soluble compound, wherein deposits can be removed repeatedly from the surface of said coating.

2. The material according to claim 1, wherein said resin swellable with water has a water contact angle of 40 degrees or less.

3. The material according to claim 1, wherein said resin swellable with water has a weight swell of at least 1.5 times.

4. The material according to claim 1, wherein said water-soluble compound has a boiling point higher than that of water, or a vapor pressure lower than that of water.

5. The material according to claim 1, wherein said water-soluble compound is at least one compound selected from the group consisting of polyols, polyoxyalkylenes, and homo- and copolymers of monomers having polar functional groups.

6. The material according to claim 5, wherein said polyol is at least one polyol selected from the group consisting of polyethylene glycol, polypropylene glycol, ethylene glycol, diethylene glycol, and glycerol.

7. The material according to claim 1, wherein said water-soluble compound is contained in an amount of at least 0.1 wt. % based on the weight of the coating.

8. The material according to claim 1, wherein said substrate is a sheet form substrate.

9. A material according to claim 8, which is an office automation sheet.

10. A method for using a coating comprising a resin swellable with water and a water-soluble compound, the method comprising the steps of:
    allowing said coating carrying adhered deposits on its surface in contact with at least one removing component selected from the group consisting of water, aqueous solutions and steam, for swelling said coating,
    removing the deposits with the removing component, and
    drying said coating to restore the reusable state of said coating.

11. A method for coating a substrate comprising:
    contacting a substrate with a coating composition (A), wherein coating composition (A) comprises:
        a resin swellable with water and a water-soluble compound, from the surface of which deposits can be removed repeatedly, and
        wherein the coating composition (A) is contacted with the substrate so to form a coating on the substrate having a thickness of 0.05 to 50 $\mu$m.

12. A material (B') which is prepared by the step of:
    contacting a substrate with a coating composition (A), wherein coating composition (A) comprises:
        a resin swellable with water and a water-soluble compound, from the surface of which deposits can be removed repeatedly, and
        wherein the coating composition (A) is contacted with the substrate so to form a coating on the substrate having a thickness of 0.05 to 50 $\mu$m.

13. The method according to claim 11, further comprising:
    a step of contacting the coating composition (A), which is in contact with the substrate, with at least one component selected from the group consisting of water, aqueous solutions and steam, and
    a step of drying the coating composition (A).

14. A material (C') which is prepared by the steps of:
    contacting a substrate with a coating composition (A) to form a material (B'),
    wherein coating composition (A) comprises:
        a resin swellable with water and a water-soluble compound, from the surface of which deposits can be removed repeatedly, and wherein
        the amount of the coating composition (A) which is contacted with the substrate is sufficient to form a coating having a thickness of 0.05 to 50 $\mu$m; and
    contacting material (B') with at least one component selected from the group consisting of water, aqueous solutions and steam, and
    drying to form material (C').

15. The method according to claim 10, wherein said water-soluble compound is a polyoxyalkylene.

16. The method according to claim 11, wherein said water-soluble compound is a polyoxyalkylene.

17. The material according to claim 12, wherein said water-soluble compound is a polyoxyalkylene.

18. The material according to claim 14, wherein said water-soluble compound is a polyoxyalkylene.

19. The material according to claim 5, wherein said water-soluble compound is a polyoxyalkylene.

* * * * *